United States Patent
Niu et al.

(10) Patent No.: US 10,538,615 B2
(45) Date of Patent: Jan. 21, 2020

(54) FIBER-REINFORCED RIGID POLYURETHANE FOAM COMPOSITE RAILWAY SLEEPER WITH HIGH FIBER CONTENT AND MANUFACTURING METHOD THEREOF

(71) Applicants: RAILWAY ENGINEERING RESEARCH INSTITUTE OF CHINA ACADEMY OF RAILWAY SCIENCES CORPORATION LIMITED, Beijing (CN); CHINA ACADEMY OF RAILWAY SCIENCES COPORATION LIMITED, Beijing (CN)

(72) Inventors: Bin Niu, Beijing (CN); Zhibin Zeng, Beijing (CN); Yonghua Su, Beijing (CN); Tibo Zhao, Beijing (CN)

(73) Assignees: RAILWAY ENGINEERING RESEARCH INSTITUTE OF CHINA ACADEMY OF RAILWAY SCIENCES CORPORATION LIMITED, Beijing (CN); CHINA ACADEMY OF RAILWAY SCIENCES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/326,219

(22) PCT Filed: Aug. 14, 2017

(86) PCT No.: PCT/CN2017/097346
§ 371 (c)(1),
(2) Date: Feb. 17, 2019

(87) PCT Pub. No.: WO2018/033041
PCT Pub. Date: Feb. 22, 2018

(65) Prior Publication Data
US 2019/0185610 A1 Jun. 20, 2019

(30) Foreign Application Priority Data
Aug. 17, 2016 (CN) .......................... 2016 1 0683181

(51) Int. Cl.
| | | |
|---|---|---|
| B29C 70/08 | (2006.01) |
| C08G 18/08 | (2006.01) |
| C08G 18/48 | (2006.01) |
| C08J 5/04 | (2006.01) |
| C08J 9/00 | (2006.01) |
| E01B 3/44 | (2006.01) |
| B29C 70/28 | (2006.01) |
| C08G 101/00 | (2006.01) |

(52) U.S. Cl.
CPC ........ *C08G 18/4829* (2013.01); *B29C 70/081* (2013.01); *B29C 70/28* (2013.01); *C08G 18/14* (2013.01); *C08J 5/041* (2013.01); *C08J 5/042* (2013.01); *C08J 5/043* (2013.01); *C08J 5/046* (2013.01); *E01B 3/44* (2013.01); *C08G 18/48* (2013.01); *C08G 2101/0025* (2013.01); *C08J 9/0085* (2013.01)

(58) Field of Classification Search
CPC ... B29C 70/081; B29C 70/28; C08G 18/4829; C08G 18/48; C08G 2101/0025; C08J 5/041; C08J 5/042; C08J 5/043; C08J 5/046; C08J 9/0085; E01B 3/00; E01B 3/44

See application file for complete search history.

(56) References Cited

U.S. PATENT DOCUMENTS

2007/0027227 A1* 2/2007 Shutov .................... C04B 26/16
521/172

FOREIGN PATENT DOCUMENTS

| CN | 101323701 A | | 12/2008 |
|---|---|---|---|
| CN | 103497503 A | | 1/2014 |
| CN | 106046312 A | * | 10/2016 |
| CN | 106120480 A | | 11/2016 |
| CN | 205917533 U | | 2/2017 |
| CN | 108316063 A | * | 7/2018 |
| CN | 108660867 | * | 10/2018 |
| JP | 2003206502 A | | 7/2003 |
| KR | 101424683 B1 | * | 8/2014 |
| KR | 101857777 | * | 5/2018 |

OTHER PUBLICATIONS

Machine Translation of CN205917533 to Niu et al. obtained from Google Translate (Year: 2019).*

* cited by examiner

*Primary Examiner* — Melissa A Rioja
(74) *Attorney, Agent, or Firm* — Gokalp Bayramoglu

(57) ABSTRACT

A fiber-reinforced rigid polyurethane foam composite railway sleeper with high fiber content and a manufacturing method thereof. The railway sleeper is formed by bonding a plurality of fiber-reinforced rigid polyurethane foam composite boards with high fiber content by a binder, and the outer surface of the railway sleeper is provided with an anticorrosive paint film. The fiber-reinforced rigid polyurethane foam composite boards with high fiber content include a polyurethane resin as a matrix material and a fiber as a reinforcing material. The problem of insufficient impregnation of the polyurethane and the fiber is solved by using a plurality of technical means such as using a mixed polyether polyol having a low hydroxyl value and a low functionality, using a coupling agent, etc., thus a fiber-reinforced rigid polyurethane foam composite product having a density higher than 840 kg/m³ and a fiber content greater than 60% is manufactured.

12 Claims, 2 Drawing Sheets

US 10,538,615 B2

FIBER-REINFORCED RIGID POLYURETHANE FOAM COMPOSITE RAILWAY SLEEPER WITH HIGH FIBER CONTENT AND MANUFACTURING METHOD THEREOF

CROSS REFERENCE TO THE RELATED APPLICATIONS

This application is the national phase entry of International Application No. PCT/CN2017/097346, filed on Aug. 14, 2017, which is based upon and claims priority to Chinese Patent Application No. 201610683181.1, filed on Aug. 17, 2016, the entire contents of which are incorporated herein by reference.

TECHNICAL FIELD

The present invention belongs to the technical field of polymer composite materials, in particular to a fiber-reinforced rigid polyurethane foam composite railway sleeper with high fiber content and a manufacturing method thereof, which is applied in the fields of heavy loading railway, high-speed railway, ordinary railway, light rail, subway, ordinary plank road, etc.

BACKGROUND

A railway sleeper is one of the railway accessories that plays a vital role in railway construction. In the rail structure, the railway sleeper is used to bear the train load, transverse and longitudinal horizontal forces transmitted from the rail, and transmit them evenly to the track bed or steel beam; meanwhile, the railway sleeper is also used to maintain the rail direction, gauge, position, etc. Therefore, the railway sleeper is required to have sufficient strength, rigidity and durability, and the size of the railway sleeper is required to be convenient for the fixation of the rail, having the ability to resist longitudinal and transverse displacement of the rail track.

At present, railway sleepers mainly include reinforced concrete railway sleepers and wooden sleepers. The mass of reinforced concrete railway sleeper is great. When prefabricated in the factory, the reinforced concrete railway sleeper needs to be embedded with plastic sleeves, and it is impossible to achieve on-site drilling for installation. Due to the requirements of high precision for the pre-embedded plastic sleeves, it is difficult to achieve close cooperation between the fastening systems and the rails. Especially in the turnout area, the error of pre-embedded plastic sleeve in the railway sleeper is prone to waste product, manpower and material resources. Moreover, the rigidity of the reinforced concrete railway sleeper is too large. The reinforced concrete railway sleeper does not have the shock absorption effect, and harms such as cracks, etc. are even prone to occur after long-term operation of the train, threatening driving safety and requiring regular maintenance and replacement, thereby increasing management costs. The production of wooden sleepers requires a large number of high-quality hardwoods. The wooden sleepers are impregnated with creosote to improve their corrosion resistance, but the use of the chemical preservative to treat the wooden sleepers has negative effects on the environment and the health of workers. Wooden sleepers are prone to suffer from corrosion in the natural environment such as sun, rain, etc., thus cracks, flaws and holes occur. During the operation, the fastening rail spikes are easy to loosen and need to be maintained and repaired regularly, and after about 5 to 10 years, they must be replaced, which greatly increases the management cost of the railway sleepers. On one hand, the supply of high-quality wood for manufacturing railway sleepers is declining, on the other hand, as the volume of transportation, the time and labor costs is increasing, the cost of maintenance and replacement of wooden sleepers is increasing.

With the improvement of people's environmental awareness, the control of construction cost, and the requirements for fast, safe and comfortable travel, composite railway sleepers will gradually replace the wooden sleepers, and will even be widely used in the ballast area.

At present, research on composite railway sleepers has begun in China and abroad. For example, the recycled waste plastics are used to make railway sleepers in United States, waste tires are used as the main material to make railway sleepers in South Korea, research on railway sleepers are mainly made of sawdust, and ongoing in Russia, research on hollow glass fiber reinforced plastics (FRP) railway sleepers are ongoing in India and China, and composite railway sleepers are made of polyurethane foam and fiberglass in Japanese and China. Although performance, such as the corrosion resistance, etc., of these composite railway sleepers are superior to those of wooden sleepers, the comprehensive properties such as strength, fatigue resistance, anti-pulling strength of the rail spike, gripping ability of the rail spike and anti-shearing property cannot meet the requirements of China Railway for composite railway sleepers. For example, the composite railway sleepers made of recycled waste plastics meet the requirements on the strength, but brittle fracture occurs in the fatigue resistance test. The hollow FRP railway sleepers meet the requirements on the strength, but anti-pulling strength of the rail spike thereof is less than 3 t, far less than the technical requirements of the anti-pulling strength of the rail spike greater than 6 t, and cracks occur in the fatigue resistance test. Serious collapses occur in the fiber-reinforced polyurethane composite railway sleepers produced in Japan and China during the fatigue resistance test, thus the fiber-reinforced polyurethane composite railway sleepers are not suitable for use in ordinary railways and heavy loading railways in China, and are only suitable for use in light rails and subways at home and abroad. The above composite railway sleepers cannot achieve all the performance requirements of the railway sleepers.

The polyurethanes used in the fiber-reinforced rigid polyurethane foam composite railway sleepers from Japan and China are formed by reacting polyether polyol with isocyanate. The used polyether polyol has high functionality. The reaction time and curing rate of the polyurethane are fast, and the curing is almost completed in about 3 minutes. Moreover, the selected polyether polyol has high viscosity and poor fluidity. Thus, the problem of uniform impregnation of polyurethane and fiber before the polyurethane is cured is difficult to be solved. Therefore, the fiber-reinforced rigid polyurethane foam composite railway sleepers currently produced at home and abroad have low fiber content, uniform impregnation of polyurethane and fiber, high local polyurethane content, large foam pores, high local fiber content, and drying yarn phenomenon, thus resulting in low and uniform strength, and unstable quality. During the production process, the resin foam expansion produces a large amount of casting fin due to low fiber content and high resin content thereof, which not only causes waste of the product, increases the production cost, but also causes great damage to the equipment and the mold. Moreover, because the problem of impregnation of polyurethane and reinforcing fibers cannot be solved, it is impossible to produce fiber-reinforced rigid polyurethane foam composite railway sleepers with relatively high fiber content, and even more impossible to produce fiber-reinforced rigid polyurethane foam composite railway sleepers with relatively high fiber content and high fiber density. At present, the fiber-reinforced rigid polyurethane foam composite railway sleepers having a density higher than 840 kg/m³ and a fiber content higher than 60% have not been reported and available on the market.

SUMMARY

In view of the technical deficiencies of the current reinforced concrete railway sleepers, wooden sleepers, glass fiber reinforced plastic railway sleepers, and fiber-reinforced rigid polyurethane foam composite railway sleepers with low fiber content, the objective of the present invention is to provide a fiber-reinforced rigid polyurethane foam composite railway sleeper with high fiber content and a manufacturing method thereof. The comprehensive performance thereof is better than the railway sleepers made of the above materials.

The technical solution of the present invention to solve the above problems is as follows. A fiber-reinforced rigid polyurethane foam composite railway sleeper with high fiber content is formed by adhering a plurality of fiber-reinforced rigid polyurethane foam composite boards with high fiber content through a binder, and the outer surface of the railway sleeper is provided with an anticorrosive paint film. The fiber-reinforced rigid polyurethane foam composite boards with high fiber content include a polyurethane resin as a matrix material and a fiber as a reinforcing material. With parts by mass, a formulation of the polyurethane resin and the mass ratio of the polyurethane resin to the reinforcing fiber are as follows:

| | |
|---|---|
| Polyether polyol A having a hydroxyl value of 400-480 and a functionality of 1-3 | 90-95 parts |
| Polyether polyol B having a hydroxyl value of 60-160 and a functionality of 1-2 | 5-10 parts |
| Flame retardant | 5-15 parts |
| Hard foam stabilizer | 2.5-5 parts |
| Coupling agent | 5-15 parts |
| Catalyst | 0.1-1 part |
| Foaming agent | 0.1-1 part |
| Antioxidant | 0.25-1 part |
| Ultraviolet screening agent | 0.25-1 part |
| Isocyanate | 100-135 parts |
| Reinforcing fiber | 420-2000 parts |

Based on the above technical solution, the present invention may further be improved as follows.

Further, the reinforcing fiber is one or a mixture selected from the group consisting of glass fiber, basalt fiber, carbon fiber, aramid fiber, and steel fiber.

Further, the reinforcing fiber is mainly composed of a long fiber, and further includes a short-cut fiber and a fiber felt.

Further, the coupling agent is a silane coupling agent.

Further, the ultraviolet screening agent is a UV-type ultraviolet screening agent.

Further, the fiber-reinforced rigid polyurethane foam composite boards with high fiber content are prepared by a continuous molding process. The continuous molding process includes seven processes of unwinding the long fiber and the fiber felt, injecting the polyurethane resin, adding the short-cut fiber, uniformly impregnating, curing in a crawler type laminating host machine, cooling and fixed length cutting.

Further, the uniformly impregnating specifically refers to uniformly impregnating the polyurethane resin on the surface of the reinforcing fiber and inside the reinforcing fiber by a high-pressure foaming machine, a moving casting device and corresponding tool equipment.

Further, the crawler type laminating host machine is composed of a crawler type laminating machine and a side stopper, the side stopper is fixed on the crawler type laminating machine, and a height and a width of a mode cavity are adjusted according to a size of the side stopper.

Further, after the fixed length cutting, the fiber-reinforced rigid polyurethane foam composite board with high fiber content has a thickness of 10 mm-120 mm, a width of 100 mm-600 mm, and a density of 200 kg/m³-2000 kg/m³.

Further, an interior of the fiber-reinforced rigid polyurethane foam composite board with high fiber content is provided with the long fiber extending along a length direction, and the outer portion of the long fiber is covered with the polyurethane resin.

Further, the interior of the fiber-reinforced rigid polyurethane foam composite board with high fiber content is further provided with the short-cut fiber extending along the length direction, and the outer portion of the short-cut fiber is covered with the polyurethane resin.

Further, the outer surface of the polyurethane resin covering the long fiber and the short-cut fiber is provided with the fiber felt.

Further, the bonding manner of the plurality of fiber-reinforced rigid polyurethane foam composite boards with high fiber content is vertical bonding, lateral bonding or cross bonding.

Further, at least two fiber-reinforced rigid polyurethane foam composite boards with high fiber content are provided, vertically arranged side by side and vertically bonded by the binder.

Further, at least two fiber-reinforced rigid polyurethane foam composite boards with high fiber content are provided, stacked from top to bottom and laterally bonded by the binder.

Further, at least four fiber-reinforced rigid polyurethane foam composite boards with high fiber content are provided, two boards are provided laterally at upper and lower ends of the other boards, and the other boards are vertically arranged side by side and vertically bonded by the binder. The two boards are laterally bonded to the other boards by the binder.

Further, the binder is any one item of a vinyl resin binder, an epoxy resin binder, a polyurethane resin binder, an ortho-phenyl resin binder, a meta-phenyl resin binder or a phenol resin binder.

Further, the anticorrosive paint film is any one item of a polyurethane paint film, a fluorocarbon paint film, an acrylic paint film, an epoxy resin paint film, or a vinyl resin paint film.

The present invention further relates to a method for manufacturing a fiber-reinforced rigid polyurethane foam composite railway sleeper with high fiber content. A fiber-reinforced rigid polyurethane foam composite board with high fiber content is first prepared and then processed. The process steps include six steps of surface grinding, bonding with a binder, mold pressing and curing, surface grinding after curing, fixed length cutting and coating.

Further, the obtained fiber-reinforced rigid polyurethane foam composite railway sleeper with high fiber content has a thickness of 100 mm-400 mm, a width of 200 mm-400 mm, and a density of 200 kg/m³-2000 kg/m³.

The fiber-reinforced rigid polyurethane foam composite railway sleeper with high fiber content of the present invention has the following advantages.

By using a mixed polyether polyol having a low hydroxyl value and a low functionality, the reaction activity of the polyurethane is reduced, the curing time of the polyurethane is prolonged, and the impregnation time of the polyurethane and the fiber is increased. Moreover, the polyether polyol used has a low viscosity and good fluidity, increasing the impregnation ability thereof with the fiber to make the impregnation with the fiber more uniform.

By increasing the coupling agent, the wettability and dispersibility of the filler in the polyurethane are greatly improved, the impregnation ability and the bonding ability of the polyurethane with the fiber are increased, the resin and the fiber are impregnated more thoroughly, the impregnation speed of the polyurethane impregnating the fiber is improved, and the problem that the reinforcing fiber is too difficult to be impregnated is solved. Therefore, the strength of the material is greatly improved, and the strength uniformity is more stable. In addition, by adding the coupling agent, the electrical properties of the material can be greatly improved.

By a plurality of technical means such as using the mixed polyether polyol having a low hydroxyl value and a low functionality, using a coupling agent, etc., the problem of insufficient impregnation of the polyurethane with the fiber is solved, thus the fiber content is increased, and a fiber-reinforced rigid polyurethane foam composite railway sleeper having a density higher than 840 kg/m³ and a fiber content greater than 60% is capable of being prepared, which fills in the technical gap of fiber-reinforced rigid polyurethane foam composite railway sleepers and makes a diversification of the product specifications and performance to meet various technical requirements.

By increasing the mass ratio of the reinforcing fiber to more than 60%, not only is the production cost reduced, but also the strength of the fiber-reinforced rigid polyurethane foam composite railway sleeper is greatly increased compared to that of the same density. The product is more compact, the water absorption and other indicators are greatly reduced, significantly improving the water resistance of the product.

By adding a hard foam stabilizer, the problem that foam pores of the polyurethane foam are excessive large is avoided, which makes the rigid polyurethane foam more uniform and more stable.

By adding the flame retardant, not only is the viscosity of the polyether polyol reduced to improve the fluidity thereof, but the flame retardancy of the material is enhanced.

By adding the antioxidant, the humidity resistance and the ageing resistance of the material are enhanced.

By adding the ultraviolet screening agent, the performance of the material in resistance to ultraviolet, sunlight and aging are further enhanced.

By increasing the short-cut fiber, the material is more compact, and the strength of the product is further improved; and by increasing the fiber felt, the anti-bending strength of the product is further improved.

By manufacturing the high-fiber-content fiber-reinforced rigid polyurethane foam composite railway board and forming by the method of bonding, the manufacturing method and process of the composite railway sleeper is simplified. The specifications and models of the composite railway sleepers are increased without increasing the investment of the mold. The problem that the polyurethane is too difficult to impregnate due to excessive fibers in the integrated molding is effectively solved. Meanwhile, composite boards of various densities can be manufactured to diversify the density of the composite railway sleeper, thereby diversifying the strength and meeting the requirements of composite railway sleepers for trains at different axle loads in railway transportation.

The comprehensive performance of the fiber-reinforced rigid polyurethane foam composite railway sleeper with high fiber content of the present invention is far superior to that of the wooden sleeper, and the strength, anti-fatigue performance, anti-pulling strength of the rail spike and anti-shearing strength are far superior to the composite railway sleepers currently studied at home and abroad.

The fiber-reinforced rigid polyurethane foam composite railway sleeper with high fiber content provided by the present invention can effectively replace the current high-quality wooden sleepers and composite railway sleepers of other materials studied at home and abroad, and can be widely used in heavy loading railways, high-speed railways, ordinary railways, light rails and subways.

Figure 1:
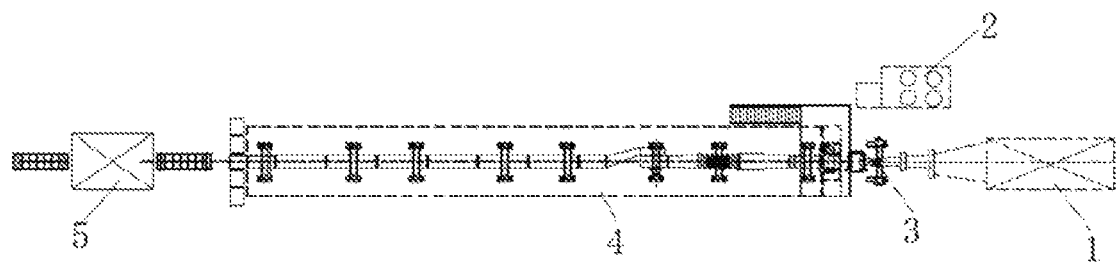
FIG. 1 is a schematic diagram showing a production process of a fiber-reinforced rigid polyurethane foam composite board with high fiber content according to the present invention.

In the drawings, components represented by each reference number are listed below:

1. creel, 2. high pressure foaming machine, 3. moving casting device, 4. crawler type laminating host machine, 5. cutting machine, 6. long fiber, 7. short-cut fiber, 8. polyurethane resin, 9. fiber felt, 10. fiber-reinforced rigid polyurethane foam composite board with high fiber content, 11. binder, 12. anticorrosive paint film.

DETAILED DESCRIPTION OF THE EMBODIMENTS

The principles and features of the present invention are described in the following with reference to the accompanying drawings. The embodiments listed are only used to illustrate the present invention, and not to limit the scope of the present invention.

The present invention relates to a fiber-reinforced rigid polyurethane foam composite railway sleeper with high fiber content. The railway sleeper is formed by binding a plurality of fiber-reinforced rigid polyurethane foam composite boards with high fiber content 10 by an binder 11, and the outer surface of the railway sleeper is provided with an anticorrosive paint film 12, the fiber-reinforced rigid polyurethane foam composite boards with high fiber content 10 includes a polyurethane resin 8 as a matrix material and a fiber as a reinforcing material. With parts by mass, a formulation of the polyurethane resin 8 and the mass ratio of the polyurethane resin 8 to the reinforcing fiber are as follows:

| | |
|---|---:|
| Polyether polyol A having a hydroxyl value of 400-480 and a functionality of 1-3 | 90-95 parts |
| Polyether polyol B having a hydroxyl value of 60-160 and a functionality of 1-2 | 5-10 parts |
| Flame retardant | 5-15 parts |
| Hard foam stabilizer | 2.5-5 parts |
| Coupling agent | 5-15 parts |
| Catalyst | 0.1-1 part |
| Foaming agent | 0.1-1 part |
| Antioxidant | 0.25-1 part |
| Ultraviolet screening agent | 0.25-1 part |
| Isocyanate | 100-135 parts |
| Reinforcing fiber | 420-2000 parts |

The reinforcing fiber is one or a mixture selected from the group consisting of glass fiber, basalt fiber, carbon fiber, aramid fiber, and steel fiber.

The reinforcing fiber is mainly composed of a long fiber 6, and further includes a short-cut fiber 7 and a fiber felt.

The coupling agent is a silane coupling agent.

The ultraviolet screening agent is a UV-type ultraviolet screening agent.

The fiber-reinforced rigid polyurethane foam composite boards with high fiber content 10 are prepared by a continuous molding process. The continuous molding process includes seven processes of unwinding the long fiber 6 and the fiber felt, injecting the polyurethane resin 8, adding the short-cut fiber 7, uniformly impregnating, curing in a crawler type laminating host machine 4, cooling and fixed length cutting.

The uniformly impregnating specifically refers to uniformly impregnating the polyurethane resin 8 on the surface of the reinforcing fiber and inside the reinforcing fiber by a high-pressure foaming machine 2, a moving casting device 3 and corresponding tool equipment.

The crawler type laminating host machine 4 is composed of a crawler type laminating machine and a side stopper, the side stopper is fixed on the crawler type laminating machine, and a height and a width of a mode cavity are adjusted according to a size of the side stopper.

The fixed length cutting is performed by the cutting machine 5, after the fixed length cutting, the fiber-reinforced rigid polyurethane foam composite board with high fiber content 10 has a thickness of 10 mm-120 mm, a width of 100 mm-600 mm, and a density of 200 kg/m$^3$-2000 kg/m$^3$.

Figure 2:
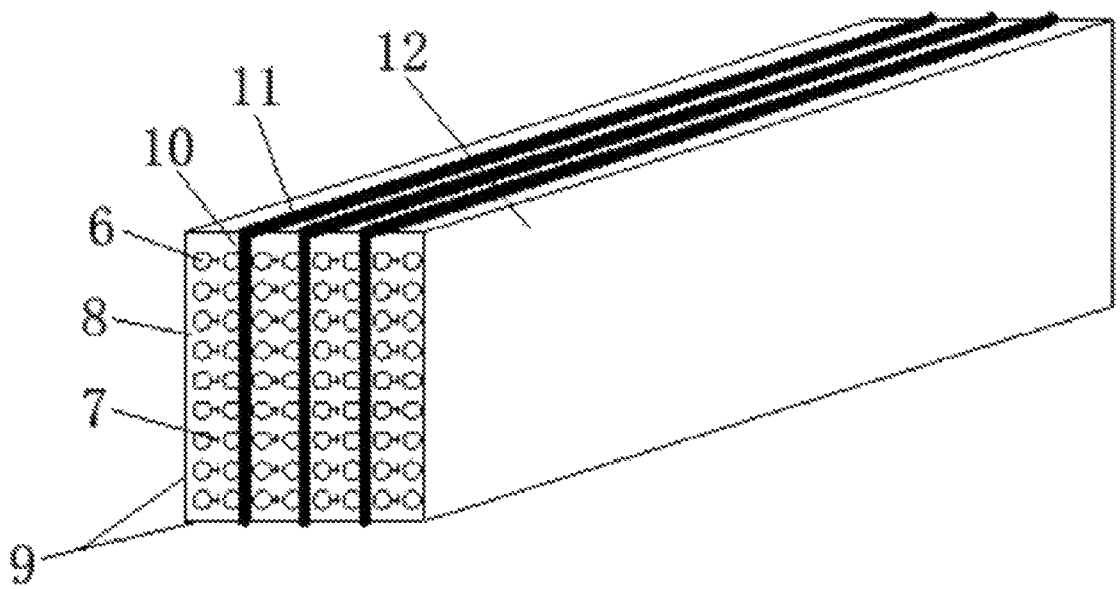
FIG. 2 is a structural schematic diagram showing that fiber-reinforced rigid polyurethane foam composite boards with high fiber content are vertically bonded into a railway sleeper according to the present invention.
Figure 3:
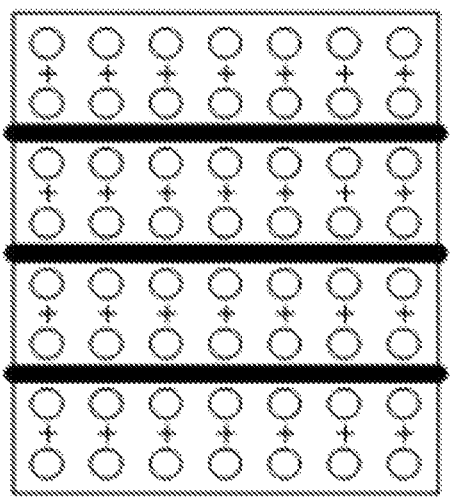
FIG. 3 is a structural schematic diagram showing that fiber-reinforced rigid polyurethane foam composite boards with high fiber content are laterally bonded into a railway sleeper according to the present invention.
Figure 4:
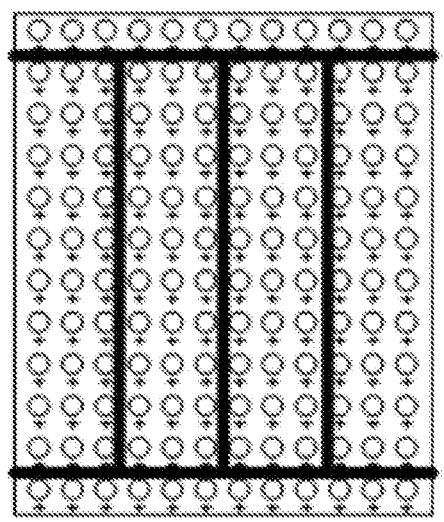
FIG. 4 is a structural schematic diagram showing that fiber-reinforced rigid polyurethane foam composite boards with high fiber content are formed into a railway sleeper through a cross bonding according to the present invention.

As shown in FIGS. 2-4, an interior of the fiber-reinforced rigid polyurethane foam composite board with high fiber content 10 is provided with the long fiber 6 extending along a length direction, and an outer portion of the long fiber 6 is covered with the polyurethane resin 8.

The interior of the fiber-reinforced rigid polyurethane foam composite board with high fiber content 10 is further provided with the short-cut fiber 7 extending along the length direction, and an outer portion of the short-cut fiber 7 is covered with the polyurethane resin 8.

The outer surface of the polyurethane resin 8 covering the long fiber 6 and the short-cut fiber 7 is provided with the fiber felt.

The bonding manner of the plurality of fiber-reinforced rigid polyurethane foam composite boards with high fiber content 10 is vertical bonding, lateral bonding or cross bonding.

As shown in FIG. 2, at least two fiber-reinforced rigid polyurethane foam composite boards with high fiber content 10 are provided, vertically arranged side by side and vertically bonded by the binder 11.

As shown in FIG. 3, at least two fiber-reinforced rigid polyurethane foam composite boards with high fiber content 10 are provided, stacked from top to bottom and laterally bonded by the binder 11.

As shown in FIG. 4, at least four fiber-reinforced rigid polyurethane foam composite boards with high fiber content 10 are provided, two boards are provided laterally at upper and lower ends of the other boards, and the other boards are vertically arranged side by side and vertically bonded by the binder 11. The two boards are laterally bonded to the other boards by the binder 11 (the cross bonding includes both the vertical bonding and the lateral bonding). In addition to the boards laterally provided at both the upper end and lower end, another board may be provided at the upper end or the lower end, that is, at least three boards are provided. One of the three boards is laterally provided at the upper ends or the lower ends of the other boards, the other boards are vertically arranged side by side, and vertically bonded by the binder 11. The one of the three boards are laterally bonded to the other boards by the binder 11.

The binder 11 is any one item of a vinyl resin binder, an epoxy resin binder, a polyurethane resin binder, an ortho-phenyl resin binder, a meta-phenyl resin binder or a phenol resin binder.

The anticorrosive paint film 12 is any one item of a polyurethane paint film, a fluorocarbon paint film, an acrylic paint film, an epoxy resin paint film, or a vinyl resin paint film.

The present invention further relates to a method for manufacturing a fiber-reinforced rigid polyurethane foam composite railway sleeper with high fiber content. A fiber-reinforced rigid polyurethane foam composite board with high fiber content 10 is first prepared and then processed. The process steps include six steps of surface grinding, bonding with a binder 11, mold pressing and curing, surface grinding after curing, fixed length cutting and coating.

The obtained fiber-reinforced rigid polyurethane foam composite railway sleeper with high fiber content has a thickness of 100 mm-400 mm, a width of 200 mm-400 mm, and a density of 200 kg/m$^3$-2000 kg/m$^3$. Preferably, the total apparent density is from 800 kg/m$^3$ to 1800 kg/m$^3$.

As shown in FIG. 1, the continuous molding process of the fiber-reinforced rigid polyurethane foam composite board with high fiber content 10 of the present invention is performed by the devices shown in the drawing. First, the long fibers and fiber felts are unwound on the creel 1, the polyurethane resin is injected, and the short-cut fibers are added. Then the uniform impregnation is realized by the high-pressure foaming machine 2, the moving casting device 3 and corresponding tool equipment. Then, curing is performed in the crawler type laminating host machine 4, and after being cooled, the cured board is cut by the cutting machine 5.

Embodiment 1

With parts by mass, a formulation of the polyurethane resin and the mass ratio of the polyurethane resin to the reinforcing fiber were as follows: 90 parts of polyether polyol A having a hydroxyl value of 400-480 and a functionality of 1-3, 10 parts of polyether polyol B having a hydroxyl value of 60-160 and a functionality of 1-2, 10 parts of flame retardant, 5 parts of hard foam stabilizer, 15 parts of coupling agent, 0.3 part of catalyst, 0.1 part of foaming agent, 0.3 part of antioxidant, 0.3 part of ultraviolet screening agent, 120 parts of isocyanate, 430 parts of long fiber, 10 parts of short-cut fiber, and 5 parts of fiber felt. The content of the reinforcing fiber was 64%, and the prepared fiber-reinforced rigid polyurethane foam composite boards with a density of 1400±50 kg/m$^3$ had a specification of 260 mm×50 mm×3000 mm. The parameters of the crawler type laminating host machine were set as follows: running speed: 0.4 m/min, and temperature: 90° C./60° C. The surface grinding was performed on the surface of the composite board. Four composite boards were vertically bonded by using a vinyl resin as a binder into a composite railway sleeper with a specification of 260 mm×200 mm×3000 mm. The performance of the composite railway sleeper manufactured according to the present embodiment was shown in Table 1.

TABLE 1

| Item | Unit | Test result |
|---|---|---|
| Total apparent density | kg/m$^3$ | 1358 |
| Bending strength | MPa | 358 |
| Bending elastic modulus | GPa | 17.8 |
| Compressive strength | MPa | 226 |
| Shear strength | MPa | 27.8 |
| Flame retardancy | | HB grade |
| Breakdown voltage | kV | 50.1 |
| Surface resistivity | Ω | 8.3 × 10$^{14}$ |
| Water absorption | mg/m$^2$ | 0.56 |
| Rail spike anti-pulling strength | kN | ≥180 |
| Anti-bending load | kN | ≥400 |
| Anti-fatigue performance | / | Under 40 t load, 2 million times without crack |
| Material strength after UV aging (UV-B lamp irradiation for 1000 h) | | |
| Bending strength | MPa | 398 |
| Bending elastic modulus | GPa | 19.8 |
| Compressive strength | MPa | 256 |
| Shear strength | MPa | 29.8 |

Embodiment 2

With parts by mass, a formulation of the polyurethane resin and the mass ratio of the polyurethane resin to the reinforcing fiber were as follows: 95 parts of polyether polyol A having a hydroxyl value of 400-480 and a functionality of 1-3, 5 parts of polyether polyol B having a hydroxyl value of 60-160 and a functionality of 1-2, 10 parts of flame retardant, 3 parts of hard foam stabilizer, 5 parts of coupling agent, 0.3 part of catalyst, 0.1 part of foaming agent, 0.3 part of antioxidant, 0.3 part of ultraviolet screening agent, 110 parts of isocyanate, 410 parts of long fiber, 10 parts of short-cut fiber, and 0 parts of fiber felt. The content of the reinforcing fiber was 65%, and the prepared fiber-reinforced rigid polyurethane foam composite boards with a density of 1200±50 kg/m$^3$ had a specification of 240 mm×50 mm×3000 mm. The parameters of the crawler type laminating host machine were set as follows: running speed: 0.6 m/min, and temperature: 90° C./60° C. One of the composite boards was grinded to have a thickness of 40 mm. Five composite boards having a thickness of 50 mm and the one composite board having a thickness of 40 mm were bonded by using an epoxy resin as a binder into a composite railway sleeper with a specification of 240 mm×290 mm×3000 mm through a cross bonding. The performance of the composite railway sleeper manufactured according to the present embodiment was shown in Table 2.

TABLE 2

| Item | Unit | Test result |
|---|---|---|
| Total apparent density | kg/m$^3$ | 1180 |
| Bending strength | MPa | 286 |
| Bending elastic modulus | GPa | 15.5 |
| Compressive strength | MPa | 204 |
| Shear strength | MPa | 25.8 |
| Flame retardancy | | HB grade |
| Breakdown voltage | kV | 50 |
| Surface resistivity | Ω | 6.3 × 10$^{14}$ |
| Water absorption | mg/m$^2$ | 0.61 |
| Rail spike anti-pulling strength | kN | 138 |
| Anti-bending load | kN | ≥400 |
| Anti-fatigue performance | / | Under 40 t load, 2 million times without crack |
| Material strength after UV aging (UV-B lamp irradiation for 1000 h) | | |
| Bending strength | MPa | 316 |
| Bending elastic modulus | GPa | 16.5 |
| Compressive strength | MPa | 228 |
| Shear strength | MPa | 27.8 |

Embodiment 3

With parts by mass, a formulation of the polyurethane resin and the mass ratio of the polyurethane resin to the reinforcing fiber were as follows: 90 parts of polyether polyol A having a hydroxyl value of 400-480 and a functionality of 1-3, 5 parts of polyether polyol B having a hydroxyl value of 60-160 and a functionality of 1-2, 15 parts of flame retardant, 5 parts of hard foam stabilizer, 10 parts of coupling agent, 0.2 part of catalyst, 0.3 part of foaming agent, 0.5 part of antioxidant, 0.5 part of ultraviolet screening agent, 115 parts of isocyanate, 520 parts of long fiber, 5 parts of short-cut fiber, and 1 part of fiber felt. The content of the reinforcing fiber was 68.5%, and the prepared fiber-reinforced rigid polyurethane foam composite boards with a density of 1000±50 kg/m$^3$ had a specification of 500 mm×30 mm×3000 mm. The parameters of the crawler type laminating host machine were set as follows: running speed: 0.5 m/min, and temperature: 90° C./70° C. The composite boards of 500 mm×30 mm were first machined into composite boards of 250 mm×30 mm. Six of the composite boards were selected to be subjected to the surface grinding, and then laterally bonded by using a vinyl resin as a binder into a composite railway sleeper with a specification of 250 mm×180 mm×3000 mm. The performance of the composite railway sleeper manufactured according to the present embodiment was shown in Table 3.

TABLE 3

| Item | Unit | Test result |
|---|---|---|
| Total apparent density | kg/m$^3$ | 1014 |
| Bending strength | MPa | 193 |
| Bending elastic modulus | GPa | 13.8 |
| Compressive strength | MPa | 112 |
| Shear strength | MPa | 13.2 |
| Flame retardancy | | HB grade |
| Breakdown voltage | kV | 50.2 |
| Surface resistivity | Ω | 2.3 × 10$^{14}$ |
| Water absorption | mg/m$^2$ | 0.63 |
| Rail spike anti-pulling strength | kN | 128 |
| Anti-bending load | kN | ≥400 |
| Anti-fatigue performance | / | Under 30 t load, 2 million times without crack |

TABLE 3-continued

| Item | Unit | Test result |
|---|---|---|
| Material strength after UV aging (UV-B lamp irradiation for 1000 h) | | |
| Bending strength | MPa | 218 |
| Bending elastic modulus | GPa | 12.7 |
| Compressive strength | MPa | 127 |
| Shear strength | MPa | 13.5 |

Embodiment 4

With parts by mass, a formulation of the polyurethane resin and the mass ratio of the polyurethane resin to the reinforcing fiber were as follows: 95 parts of polyether polyol A having a hydroxyl value of 400-480 and a functionality of 1-3, 10 parts of polyether polyol B having a hydroxyl value of 60-160 and a functionality of 1-2, 5 parts of flame retardant, 5 parts of hard foam stabilizer, 10 parts of coupling agent, 0.1 part of catalyst, 0.1 part of foaming agent, 0.25 part of antioxidant, 0.25 part of ultraviolet screening agent, 125 parts of isocyanate, 460 parts of long fiber, 10 parts of short-cut fiber, and 0 parts of fiber felt. The content of the reinforcing fiber was 65%, and the prepared fiber-reinforced rigid polyurethane foam composite boards with a density of 800±50 kg/m³ had a specification of 200 mm×60 mm×3000 mm. Three composite boards were subjected to the surface grinding, and laterally bonded by using a vinyl resin as a binder into a composite railway sleeper with a specification of 200 mm×60 mm×3000 mm. The performance of the composite railway sleeper manufactured according to the present embodiment was shown in Table 4.

TABLE 4

| Item | Unit | Test result |
|---|---|---|
| Total apparent density | kg/m³ | 806 |
| Bending strength | MPa | 138 |
| Bending elastic modulus | GPa | 10.8 |
| Compressive strength | MPa | 108 |
| Shear strength | MPa | 12 |
| Flame retardancy | | HB grade |
| Breakdown voltage | kV | 50.2 |
| Surface resistivity | Ω | $2.2 \times 10^{13}$ |
| Water absorption | mg/m² | 0.73 |
| Rail spike anti-pulling strength | kN | 92 |
| Anti-bending load | kN | 242 |
| Anti-fatigue performance | / | Under 20 t load, 2 million times without crack |
| Material strength after UV aging (UV-B lamp irradiation for 1000 h) | | |
| Bending strength | MPa | 171 |
| Bending elastic modulus | GPa | 11.2 |
| Compressive strength | MPa | 117 |
| Shear strength | MPa | 12.5 |

Embodiment 5

With parts by mass, a formulation of the polyurethane resin and the mass ratio of the polyurethane resin to the reinforcing fiber were as follows: 92 parts of polyether polyol A having a hydroxyl value of 400-480 and a functionality of 1-3, 8 parts of polyether polyol B having a hydroxyl value of 60-160 and a functionality of 1-2, 10 parts of flame retardant, 2.5 parts of hard foam stabilizer, 15 parts of coupling agent, 1 part of catalyst, 1 part of foaming agent, 1 part of antioxidant, 1 part of ultraviolet screening agent, 100 parts of isocyanate, 1330 parts of long fiber, 30 parts of short-cut fiber, and 10 parts of fiber felt. The content of the reinforcing fiber was 85%, and the prepared fiber-reinforced rigid polyurethane foam composite boards with a density of 1500±50 kg/m³ had a specification of 600 mm×10 mm×3000 mm. The parameters of the crawler type laminating host machine were set: running speed: 0.4 m/min, and temperature: 90° C./60° C. The composite boards of 600 mm×10 mm were first machined into composite boards of 300 mm×10 mm. Ten of the composite boards were subjected to the surface grinding, laterally bonded by using an epoxy resin as a binder into a composite railway sleeper with a specification of 300 mm×100 mm×3000 mm. The performance of the composite railway sleeper manufactured according to the present embodiment was shown in Table 5.

TABLE 5

| Item | Unit | Test result |
|---|---|---|
| Total apparent density | kg/m³ | 1521 |
| Bending strength | MPa | 377 |
| Bending elastic modulus | GPa | 19.2 |
| Compressive strength | MPa | 234 |
| Shear strength | MPa | 29.8 |
| Flame retardancy | | HB grade |
| Breakdown voltage | kV | 50.7 |
| Surface resistivity | Ω | $8.9 \times 10^{14}$ |
| Water absorption | mg/m² | 0.53 |
| Rail spike anti-pulling strength | kN | ≥180 |
| Anti-bending load | kN | ≥400 |
| Anti-fatigue performance | / | Under 40 t load, 2 million times without crack |
| Material strength after UV aging (UV-B lamp irradiation for 1000 h) | | |
| Bending strength | MPa | 428 |
| Bending elastic modulus | GPa | 22.8 |
| Compressive strength | MPa | 276 |
| Shear strength | MPa | 31.3 |

Embodiment 6

With parts by mass, a formulation of the polyurethane resin and the mass ratio of the polyurethane resin to the reinforcing fiber were as follows: 93 parts of polyether polyol A having a hydroxyl value of 400-480 and a functionality of 1-3, 7 parts of polyether polyol B having a hydroxyl value of 60-160 and a functionality of 1-2, 10 parts of flame retardant, 2.5 parts of hard foam stabilizer, 15 parts of coupling agent, 0.8 part of catalyst, 0.6 part of foaming agent, 0.7 part of antioxidant, 0.5 part of ultraviolet screening agent, 135 parts of isocyanate, 1940 parts of long fiber, 40 parts of short-cut fiber, and 20 parts of fiber felt. The content of the reinforcing fiber was 88%, and the prepared fiber-reinforced rigid polyurethane foam composite boards with a density of 1800±50 kg/m³ had a specification of 100 mm×100 mm×3000 mm. The parameters of the crawler type laminating host machine were set as follows: running speed: 0.4 m/min, and temperature: 90° C./60° C. Sixteen composite boards were selected, and bonded through a cross bonding by using an epoxy resin as a binder into a composite railway sleeper with a specification of 400 mm×400 mm×3000 mm. The obtained composite railway sleeper has a four-layer structure with four composite boards in each layer. The performance of the composite railway sleeper manufactured according to the present embodiment was shown in Table 6.

TABLE 6

| Item | Unit | Test result |
|---|---|---|
| Total apparent density | kg/m$^3$ | 1768 |
| Bending strength | MPa | 413 |
| Bending elastic modulus | GPa | 23.8 |
| Compressive strength | MPa | 253 |
| Shear strength | MPa | 31.5 |
| Flame retardancy | | HB grade |
| Breakdown voltage | kV | 51.3 |
| Surface resistivity | Ω | 9.4 × 10$^{14}$ |
| Water absorption | mg/m$^2$ | 0.52 |
| Rail spike anti-pulling strength | kN | ≥180 |
| Anti-bending load | kN | ≥400 |
| Anti-fatigue performance | / | Under 40 t load, 2 million times without crack |
| Material strength after UV aging (UV-B lamp irradiation for 1000 h) | | |
| Bending strength | MPa | 468 |
| Bending elastic modulus | GPa | 26.8 |
| Compressive strength | MPa | 287 |
| Shear strength | MPa | 35.8 |

Comparative Analysis

In the fiber-reinforced rigid polyurethane foam composite railway sleeper with high fiber content of the present invention, the problem of insufficient impregnation of the polyurethane and the fiber is solved by using a plurality of technical means such as using a mixed polyether polyol having a low hydroxyl value and a low functionality, using a coupling agent, etc., thus the fiber content is increased and a fiber-reinforced rigid polyurethane foam composite product having a density higher than 840 kg/m$^3$ and a fiber content greater than 60% is capable of being prepared, which fills in the technical gap of fiber-reinforced rigid polyurethane foam composite railway sleepers and makes a diversification of the product specifications and performance to meet various technical requirements.

By increasing the mass ratio of the reinforcing fiber to more than 60%, not only is the production cost reduced, but also the strength of the fiber-reinforced rigid polyurethane foam composite railway sleeper is greatly increased compared to that at the same density. The product is more compact, the water absorption and other indicators are greatly reduced, which improves the water resistance of the product.

By manufacturing the high-fiber-content fiber-reinforced rigid polyurethane foam composite railway board and forming by the method of bonding, the manufacturing method and process of the composite railway sleeper are simplified, and the specifications and models of the composite railway sleeper are increased without increasing the investment of the mold. The problem that the polyurethane is too difficult to impregnate due to excessive fibers in the integrated molding is solved. Meanwhile, composite boards of various densities can be manufactured to diversify the density of the composite railway sleepers, thereby diversifying the strength and meeting the requirements of composite railway sleepers for trains at different axle loads in railway transportation.

At present, no reports and material objects of the fiber-reinforced rigid polyurethane foam composite railway sleeper with a fiber density higher than 840 kg/m$^3$ and a fiber content higher than 60% have been seen. The composite railway sleeper with a density of 800±50 kg/m$^3$ is prepared by the manufacturing method of the present invention, which is tested and compared with the material objects of fiber-reinforced rigid polyurethane foam composite railway sleepers produced by well-known domestic and foreign manufacturers. The results are shown in Table 7.

| | Test items | Average value of test results of foreign manufacturer | Average value of test results of domestic manufacturer | Average value of test results of the present invention |
|---|---|---|---|---|
| Mechanical properties of materials at room temperature | Bending strength, MPa | 86.8 | 85.2 | 138 |
| | Bending elastic modulus, GPa | 6.35 | 7.69 | 10.8 |
| | Longitudinal compressive strength, MPa | 48.9 | 73.1 | 108 |
| | Shear strength, MPa | 10.9 | 8.77 | 12 |
| Mechanical properties of materials after UV aging | Bending strength, MPa | 87.3 | 106 | 171 |
| | Bending elastic modulus, GPa | 5.65 | 9.4 | 11.2 |
| | Longitudinal compressive strength, MPa | 51.3 | 74.3 | 117 |
| | Shear strength, MPa | 7.6 | 9.1 | 12.5 |
| Mechanical properties of finished product | Thread rail spike anti-pulling strength, kN | 49.1 | 48 | 92 |
| | Anti-bending load, kN | 198 | 186 | 243 |
| | Anti-fatigue property | 10$^5$ no abnormality | 10$^5$ no abnormality | 2 × 10$^6$ no abnormality |
| Electrical properties | Insulation resistance, Ω | 1.3 × 10$^{13}$ | 1.68 × 10$^{10}$ | 2.2 × 10$^{13}$ |
| | Breakdown voltage, kV | 38.7 | 32.0 | 50.2 |
| Other properties | Water absorption, mg/m$^2$ | 61 | 7.77 | 0.73 |
| | Horizontal burning level | HB | HB | HB |
| | Fiber content, % | 45.5 | 50.5 | 62.5 |
| | Total apparent density, kg/m$^3$ | 788 | 792 | 806 |

Conclusion of Comparative Analysis

It can be seen that the fiber-reinforced rigid polyurethane foam composite railway sleeper with high fiber content of the present invention has a fiber content of more than 60%. In the case where the density is almost the same, the manufactured products are far superior to the composite railway sleeper products of well-known domestic and foreign manufacturers in terms of mechanical properties, anti-UV aging properties, electrical properties, water resistance, etc., especially anti-bending properties, thread rail spike anti-pulling strength and anti-fatigue properties of the composite railway sleepers.

The above descriptions are only the preferred embodiments of the present invention and are not intended to limit the present invention. Any modifications, equivalent substitutions, improvements, etc. made within the spirit and scope of the present invention should be included within the scope of the present invention.

What is claimed is:

1. A fiber-reinforced rigid polyurethane foam composite railway sleeper, wherein
    the fiber-reinforced rigid polyurethane foam composite railway sleeper is formed by bonding a plurality of fiber-reinforced rigid polyurethane foam composite boards together with a binder;
    an outer surface of the fiber-reinforced rigid polyurethane foam composite railway sleeper is provided with an anticorrosive paint film;
    the fiber-reinforced rigid polyurethane foam composite boards comprise a polyurethane resin as a matrix material and a fiber as a reinforcing material; and
    the fiber-reinforced rigid polyurethane foam composite boards are prepared from a formulation comprising:

| | |
|---|---|
| a polyether polyol A having a hydroxyl value of 400-480 and a functionality of 2-3 | 90-95 parts by mass |
| a polyether polyol B having a hydroxyl value of 60-160 and a functionality of 2 | 5-10 parts by mass |
| flame retardant | 5-15 parts by mass |
| hard foam stabilizer | 2.5-5 parts by mass |
| coupling agent | 5-15 parts by mass |
| catalyst | 0.1-1 parts by mass |
| foaming agent | 0.1-1 parts by mass |
| antioxidant | 0.25-1 parts by mass |
| ultraviolet screening agent | 0.25-1 parts by mass |
| isocyanate | 100-135 parts by mass |
| reinforcing fiber | 420-2000 parts by mass. |

2. The fiber-reinforced rigid polyurethane foam composite railway sleeper of claim 1, wherein, the reinforcing fiber is one or more selected from the group consisting of glass fiber, basalt fiber, carbon fiber, aramid fiber, and steel fiber.

3. The fiber-reinforced rigid polyurethane foam composite railway sleeper of claim 1, wherein the fiber-reinforced rigid polyurethane foam composite boards have a thickness of 10 mm-120 mm, a width of 100 mm-600 mm, and a density of 200 kg/m$^3$-2000 kg/m$^3$.

4. The fiber-reinforced rigid polyurethane foam composite railway sleeper of claim 1, wherein, said bonding of the plurality of fiber-reinforced rigid polyurethane foam composite boards is selected from the group consisting of vertical bonding, lateral bonding, and cross bonding.

5. The fiber-reinforced rigid polyurethane foam composite railway sleeper of claim 4, wherein, at least two fiber-reinforced rigid polyurethane foam composite boards are provided, vertically arranged side by side, and vertically bonded by the binder.

6. The fiber-reinforced rigid polyurethane foam composite railway sleeper of claim 4, wherein, at least two fiber-reinforced rigid polyurethane foam composite boards are provided, and laterally bonded by the binder.

7. The fiber-reinforced rigid polyurethane foam composite railway sleeper of claim 4, wherein, at least four fiber-reinforced rigid polyurethane foam composite boards are provided, and
    at least two of the at least four fiber-reinforced rigid polyurethane foam composite boards are arranged laterally and at least two additional fiber-reinforced rigid polyurethane foam composite boards are arranged vertically and bonded to each other via the binder.

8. The fiber-reinforced rigid polyurethane foam composite railway sleeper of claim 1, wherein, the binder is selected from the group consisting of a vinyl resin binder, an epoxy resin binder, a polyurethane resin binder, an ortho-phenyl resin binder, a meta-phenyl resin binder and a phenol resin binder.

9. The fiber-reinforced rigid polyurethane foam composite railway sleeper of claim 1, wherein, the anticorrosive paint film is selected from the group consisting of a polyurethane paint film, a fluorocarbon paint film, an acrylic paint film, an epoxy resin paint film, and a vinyl resin paint film.

10. A method for manufacturing the fiber-reinforced rigid polyurethane foam composite railway sleeper of claim 1, comprising the following steps:
    preparing the fiber-reinforced rigid polyurethane foam composite boards
    grinding a surface of the fiber-reinforced rigid polyurethane foam composite boards,
    bonding with a binder the fiber-reinforced rigid polyurethane foam composite boards,
    mold pressing and curing the fiber-reinforced rigid polyurethane foam composite boards,
    grinding after curing the surface of the fiber-reinforced rigid polyurethane foam composite boards,
    cutting the fiber-reinforced rigid polyurethane foam composite boards, and
    coating the fiber-reinforced rigid polyurethane foam composite board.

11. The method of claim 10, wherein, the fiber-reinforced rigid polyurethane foam composite railway sleeper has a thickness of 100 mm-400 mm, a width of 200 mm-400 mm, and a density of 200 kg/m$^3$-2000 kg/m$^3$.

12. The fiber-reinforced rigid polyurethane foam composite railway sleeper of claim 2, wherein, the binder is selected from the group consisting of a vinyl resin binder, an epoxy resin binder, a polyurethane resin binder, an ortho-phenyl resin binder, a meta-phenyl resin binder and a phenol resin binder.

* * * * *